Figure 1:
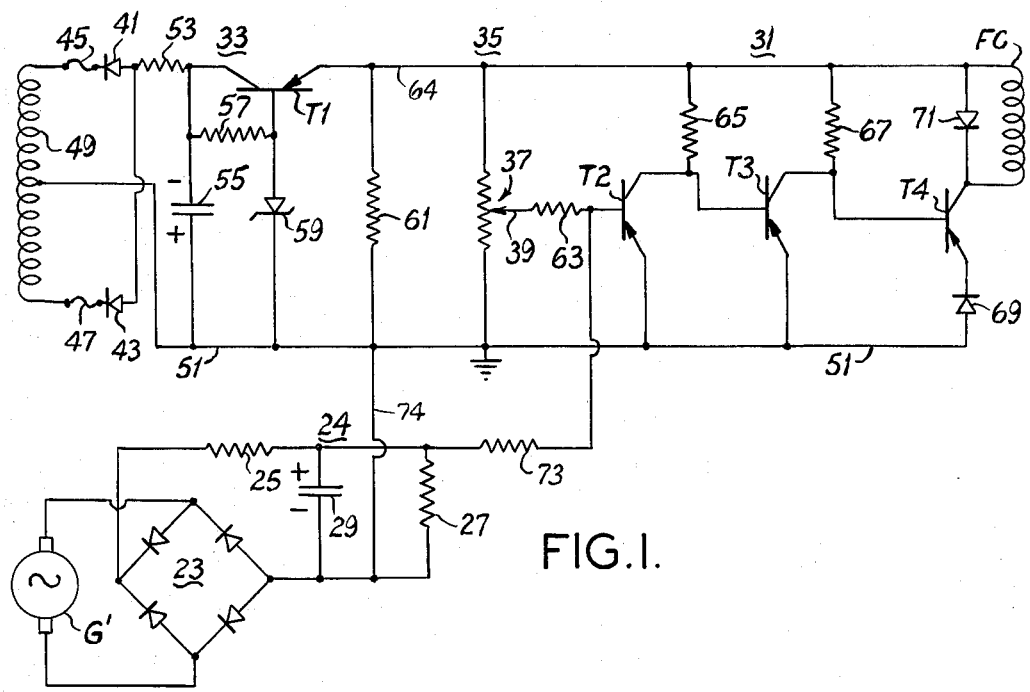

United States Patent Office 3,207,950
Patented Sept. 21, 1965

3,207,950
CONTROL FOR ELECTRICAL COUPLING
APPARATUS
Aubrey H. Smith, Kenosha, Wis., assignor to Eaton Manufacturing Company, Cleveland, Ohio, a corporation of Ohio
Filed Oct. 15, 1962, Ser. No. 230,335
9 Claims. (Cl. 317—5)

This invention relates to a control for electrical coupling apparatus, and more particularly to an electronic system for regulating the angular velocity of a rotating shaft.

Among the several objects of this invention may be noted the provision of a control for energizing a field coil associated with electrical coupling apparatus for regulating the angular velocity of a rotating shaft; the provision of such a control which employs one or more power transistors, and wherein the thermal dissipation in these transistors is appreciably reduced; the provision of a control for regulating the speed of a rotating shaft in which response time is greatly reduced and wherein the angular velocity of a rotating member is more precisely controlled and regulated; the provision of a control of the class described which functions as a critically damped servo system; and the provision of a control for electrical coupling apparatus which is inexpensive, rugged, and reliable in operation. Other objects and features will be in part apparent and in part pointed out hereinafter.

In its broader aspects, the invention is directed to a control for electrical coupling apparatus having a rotating shaft and a field coil for varying the angular velocity of this shaft. This control comprises an amplifier including a transistor having a control element adapted to control the conductivity of this transistor between a conducting state and a cutoff state. The field coil is energized by the amplifier when the transistor is in its conducting state, but is deenergized when this transistor is cut off. Also included in the control are means for repetitively pulsing the transistor between its conducting and cut-off states, and for controlling the relative ratio between the periods of conduction and cutoff, thereby to variably energize the field coil. This pulsing and controlling means includes: first, a generator for sensing the angular velocity of the shaft to be controlled and producing an electrical signal having an amplitude which is a function of this angular velocity; secondly, means electrically interconnected with this generator for supplying a composite electrical signal having an A.C. component and a D.C. component, the magnitude of the D.C. component being a function of the angular velocity of the controlled shaft; and thirdly, a D.C. potential source adapted to supply a D.C. voltage which has a magnitude which is a function of a preselected angular velocity of the shaft. In a specific embodiment, this D.C. potential source comprises a potentiometer having a fixed resistance connected across a D.C. power supply and a movable contact which may be set or adjusted in accordance with the preselected angular velocity of the shaft. The control further comprises an electrical circuit which interconnects the pulsing and controlling means to the control element of the transistor within the amplifier so that the relative ratio between conduction and cutoff periods of this transistor is a function of the difference between the magnitude of said composite signal and the magnitude of the D.C. voltage supplied by said D.C. potential source. The result is that the average level of the electrical power supplied to the field coil is controlled to maintain the angular velocity of the rotating shaft substantially equal to the preselected or predetermined angular velocity. The invention accordingly comprises the constructions herein-after described, the scope of the invention being indicated in the following claims.

Figure 2:
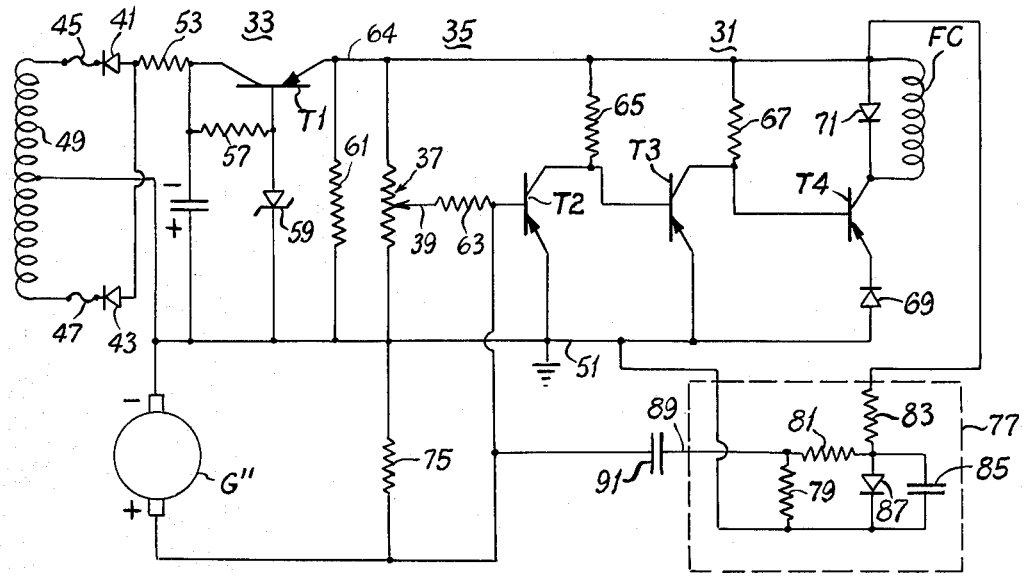
Figure 4A:
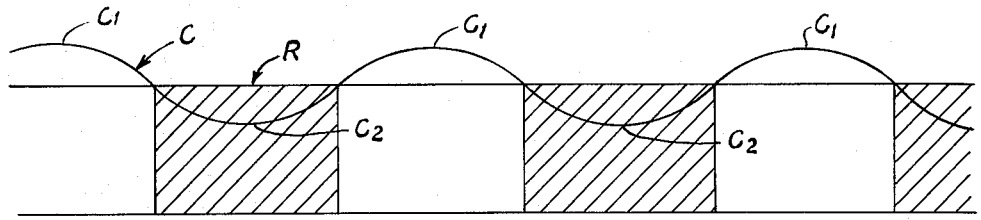
Figure 4B:
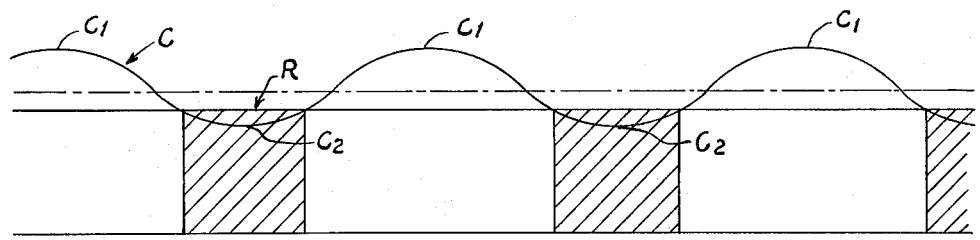
Figure 4C:
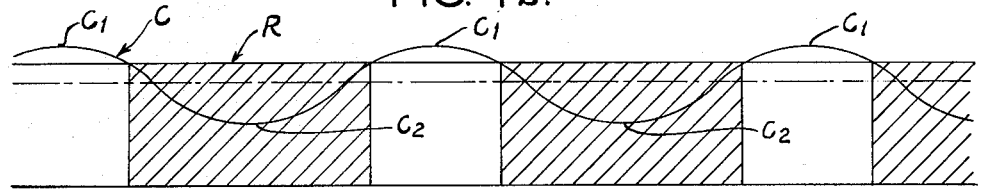
Figure 3:
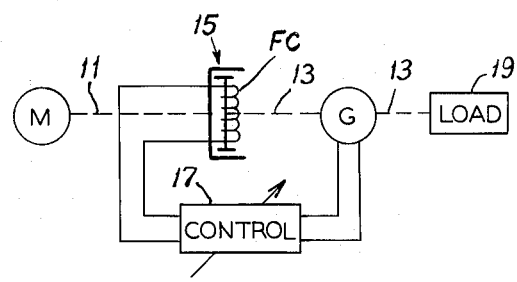

In the accompanying drawings in which two of various possible embodiments of the invention are illustrated, FIG. 1 is a circuit diagram of a first embodiment of the present invention;

FIG. 2 is a circuit diagram of a second embodiment of this invention;

FIG. 3 schematically illustrates electrical apparatus in which the angular velocity of a rotating shaft is controlled in accordance with this invention; and FIGS. 4a, 4b and 4c are waveforms useful in explaining the operation of the invention.

Corresponding reference characters indicate corresponding parts throughout the drawings.

Referring now to the drawings, and more particularly to FIG. 3 which illustrates electrical apparatus having a rotating shaft, the angular velocity of which is to be controlled or regulated according to this invention. This apparatus is illustrated as comprising a driving member 11, a driven member 13 and an electromagnetic coupling device 15. Driving member 11 is constituted by a rotating shaft driven by any suitable means, for example, by an electrical motor M. Coupling device 15 includes a field coil FC energized by the output of a control circuit 17. The average power supplied to field coil FC by control 17 controls the degree of coupling between driving member 11 and driven member 13, and thereby determines the angular velocity of this driven member. Control 17 includes means for preselecting a desired angular velocity of shaft 13. Torque is transferred through shaft 13 to a load indicated at 19. An electric tachometer or generator G, driven by shaft 13, provides an electrical signal in response to the rotation of this shaft having an amplitude proportional to the angular velocity thereof. This signal is applied as an input signal to control circuit 17. In the embodiment illustrated in FIG. 1, generator G is an A.C. tachometer, for example, a permanent-magnet alternator; while in the embodiment illustrated in FIG. 2, this generator is a D.C. generator. In either embodiment, the control circuit 17 is responsive to the output of generator G and energizes field coil FC to maintain the angular velocity of shaft 13 at the preselected value under conditions of varying loads, etc.

Referring now to FIG. 1, an A.C. tachometer version of this invention is illustrated as comprising an A.C. tachometer or generator G'. This tachometer senses the rotation of the rotating shaft whose angular velocity is to be controlled, and generates an A.C. signal having an amplitude proportional to this angular velocity. The output of generator G' is rectified by a full-wave bridge-type rectifier 23, and filtered by an RC network 24 which comprises a pair of resistors 25 and 27, and a capacitor 29. The parameters of this filter circuit are chosen so as to not entirely eliminate the A.C. ripple component of the rectified signal appearing at the output of bridge circuit 23. Stated somewhat differently, filter network 24 is designed to pass a portion of the A.C. ripple component present in the pulsating D.C. signal appearing at the output of rectifier 23. Accordingly, the output of the filter network, appearing across resistor 27, is a composite signal; it has a D.C. component, the magnitude of which is proportional to the angular velocity of the controlled shaft 13, and an A.C. component, the amplitude of which is substantially independent of this angular velocity.

In addition to the rectifier 23 and filter circuit 24, the FIG. 1 circuit includes a transistor amplifier 31, a regulated D.C. power supply 33, and a biasing means 35 illustrated as comprising a potentiometer 37 having a movable contact 39. Field coil FC is connected across the output terminals of amplifier 31. As explained hereinafter, any desired angular velocity of the controlled shaft is preselected by the adjustment or positioning of movable contact 39, and amplifier 31 controls the energization of field coil FC to maintain the angular velocity of the shaft 13 substantially equal to this preselected angular velocity. Regulated power supply 33 includes a pair of rectifying diodes 41 and 43, connected by two fuses 45 and 47 to respective end terminals of a center-tapped coil 49. This coil may be either the secondary winding of a power transformer or it may be a center-tapped motor winding associated with the driving motor M. The center terminal of this coil is connected to a common ground for the circuit illustrated at 51. Diodes 41 and 43, in combination with coil 49, constitute a full-wave rectifier, the output of which is applied to a smoothing and regulating filter network consisting of a resistor 53 and smoothing capacitor 55, and a voltage regulating transistor T1 having a Zener diode 59 interconnected between its base electrode and ground and a resistor 57 interconnected between its base and collector elements. The regulated D.C. output of power supply 33 appears across a resistor 61.

Amplifier 31 is a three-stage amplifier which includes three transistors, T2, T3 and T4. The base of input transistor T2 is connected to movable contact 39 of biasing potentiometer 37 by a coupling resistor 63. The collectors of transistors T2 and T3 are connected to the negative polarity terminal (constituted by conductor 64) of power supply 33 by respective collector resistors 65 and 67. The emitters of transistors T2 and T3 are each connected to common ground 51, which constitutes the positive polarity terminal of power supply 33. The emitter of output or power transistor T4 is connected to ground by a biasing diode 69. Connected in the collector circuit of this output transistor is the field coil FC of the electromagnetic coupling device in shunt with a transient-suppressing current-sustaining diode 71. The composite signal appearing at the output of filter circuit 24 is applied between the base or control element of transistor T2 and its emitter by a coupling resistor 73 and a conductor 74.

The operation of the FIG. 1 apparatus is as follows: The armature of A.C. generator G' is driven by shaft 13 whose angular velocity is to be controlled, thereby producing at the output terminals of this generator an A.C. signal having an amplitude proportional to the angular velocity of this shaft. This A.C. output signal is applied to rectifying bridge 23 where it is converted to a pulsating D.C. signal which is in turn applied to RC filter network 24. As noted above, the parameters of network 24, or more particularly the size of capacitor 29, are chosen so as to not entirely eliminate the A.C. or ripple component of this pulsating D.C. signal. As a result, the signal appearing at the output of filter network 24 is a composite signal having a D.C. component and an A.C. component. This composite signal is illustrated at C in each of FIGS. 4a, 4b and 4c. The average value or D.C. component of this signal is indicated by the dashed lines in FIGS. 4b and 4c. Because of the A.C. or time-varying component of signal C, the instantaneous value or magnitude of wave C (taken along the ordinate axis) varies from maximums at $C_1$ to minimums at $C_2$. This composite signal is applied to the base of transistor T2 by resistor 73.

The desired angular velocity of the controlled shaft is preselected by biasing potentiometer 37. The fixed resistance of this potentiometer is connected across the output of power supply 33 and when movable contact 39 is positioned in accordance with a preselected desired angular velocity, the D.C. voltage appearing on this contact, with respect to ground conductor 51, has a magnitude proportional to this preselected angular velocity. This voltage constitutes a reference potential for the system and is indicated at R in FIGS. 4a, 4b and 4c. It should be noted that while in FIGS. 4a, 4b and 4c both the composite signal C and the reference signal R are illustrated for purposes of explanation as having the same polarity, these signals are of opposite polarities with respect to ground, i.e., in the arrangement illustrated in FIG. 1 composite signal C is positive with respect to ground conductor 51, while reference signal R is negative with respect thereto. Reference signal R is applied to the base of transistor T2 to bias this resistor. As a result, in the specific embodiment illustrated, transistor T2 conducts only when the instantaneous value or magnitude of the composite signal C goes below, or is less than the magnitude of the reference potential R. Stated somewhat differently, the composite signal C, being of positive polarity, tends to drive transistor T2 to its cutoff or nonconducting state, whereas the reference signal R, being negative with respect to ground, tends to bias this transistor to its "on" or conducting state. Therefore, transistor T2 conducts only when the instantaneous value of signal C is less than the magnitude of reference signal R. The resulting pulses appearing at the output of transistor T2 are amplified by transistor T3 and applied to the base or control element of power transistor T4 to repetitively pulse this power transistor between its conducting state and its cutoff state. The average level of electrical power supplied to coil FC is directly proportional to the length of the periods of conduction of transistor T4 relative to the period of the A.C. component of the composite signal.

The duty cycle of output transistor T4, i.e., the relative ratio of conducting and cutoff periods of this transistor, depends on the preset angular velocity of shaft 13 and upon the load 19. This duty cycle will vary from a low value under conditions of relatively low preset angular velocity and light loading to a high value for high-speed operation under heavy load conditions. It will be assumed for purposes of explanation that the preselected speed of shaft 13 and the load conditions are such that a duty cycle of 50% is required to maintain the angular velocity of shaft 13 at this particular preselected value. Under these conditions, if the D.C. component or average value of composite signal C is equal to the reference level R (indicating that the controlled shaft is rotating at the preselected angular velocity), transistor T2 will conduct during the entire negative portion of a cycle of the A.C. component of signal C, but will be cutoff or nonconducting during the positive portion of this cycle. Accordingly, transistor T2 will be conducting half the time and cut off half the time, and power transistor T4 will have a 50% duty cycle to supply the proper amount of average power to field coil FC to maintain the speed of the controlled shaft at its preset value. These conditions are illustrated in FIG. 4a wherein the average value of signal C and the reference level R coincide. The shaded areas indicate the periods of conduction of transistors T2 and T4 which occur whenever the instantaneous value of signal C goes below level R.

On the other hand, if the angular velocity of the controlled shaft is greater than the preselected value, the average value or D.C. component of signal C has a level greater than that of the reference level R. Under these conditions, signal C goes below reference level R during only a part of the negative portion of the A.C. component of signal C and transistor T2 is caused to conduct only during this part of the negative portion. The relative ratio of conducting and cutoff periods of transistor T4 is thus reduced, and as a result the average power transferred to field coil FC is diminished. This causes the shaft to slow down to the desired angular velocity. These conditions are illustrated in FIG. 4b wherein the dashed line which represents the D.C. component of the composite signal is shown to be above the reference level R. Again the shaded areas represent the periods of conduction of transistor T2.

Finally, if the angular velocity of the controlled shaft is less than the desired value, the D.C. component of the composite signal is less than the reference level R, and the composite signal goes below the reference voltage during the entire negative portion of an A.C. cycle and also during part of the positive portion of this cycle. FIG. 4c illustrates these conditions wherein transistor T2 is caused to conduct more than half the time, resulting in an increase in the relative ratio of conducting and cutoff periods of transistor T4. Under these conditions the average power supplied to the field coil FC is increased, thereby causing the controlled shaft to speed up to the desired or preselected angular velocity.

Throughout the above description it has been assumed that the preselected speed of shaft 13 and the load conditions are such that a 50% duty cycle of transistor T4 is required to maintain the angular velocity of shaft 13 equal to this preselected speed. It should be understood that in any specific control arrangement the duty cycle of transistor T4 varies with the speed setting and with load variations.

In view of the foregoing, it is apparent that the apparatus of FIG. 1, by controlling the relative ratio between conduction periods and cutoff periods of power transistor T4, functions to maintain the angular velocity of the controlled shaft equal, or substantially equal to the preselected angular velocity determined by the setting of movable contact 39. Because the transistors of amplifier 31, and especially output transistor T4, are triggered or switched on and off, and the duty cycle or ratio of on and off periods of these transistors varied to modify the field coil energization, the thermal dissipation in these transistors per unit of power transferred to the field coil is greatly reduced. This feature provides greater efficiency of power transfer to the field coil, thus permitting the use of power transistors having smaller continuous power ratings or capacity. This in turn lowers the cost of the control unit, and also insures greater reliability. Moreover, because filter network 24 is designed to pass a portion of the A.C. or ripple component of the rectified signal appearing at the output of rectifier 23, the time constant of this circuit is much less than if this circuit were required to eliminate this ripple component altogether to produce a steady or constant value D.C. output. This markedly reduces the response time of the control, resulting in tighter and more precise speed regulation of the controlled shaft. Also, because of the reduced time constant of filter 24, the control may be designed to function as a critically damped servo or feedback system. This latter feature permits maximum regulation of the controlled shaft while avoiding instabilities inherent in prior art systems which are not critically damped. In one specific embodiment of the FIG. 1 control, the angular velocity of a driven shaft was observed to be controlled to within 2% regulation over a speed range of from 1600 r.p.m. to 50 r.p.m., a speed range of 32 to 1.

A second embodiment of this invention is illustrated in FIG. 2. This embodiment employs a three-stage amplifier, regulated D.C. power supply, and a biasing means identical to those illustrated in FIG. 1, and like elements are indicated by corresponding reference numerals. In FIG. 2, instead of employing an A.C. tachometer, a D.C. tachometer or generator G'' senses the rotation of the shaft whose angular velocity is to be controlled. The output of generator G'', appearing across a resistor 75, is a D.C. signal proportional in magnitude to this angular velocity. In this embodiment, the output of an oscillator circuit 77 is combined with this D.C. signal to provide the composite signal C. Oscillator 77 may be any suitable A.C. oscillator circuit; it is illustrated as being a relaxation-type oscillator which includes three resistors 79, 81 and 83, a capacitor 85, and a diode 87. The output of oscillator 77 appearing on a conductor 89 is coupled to, or combined with, the output of generator G'' by a coupling capacitor 91. The resulting composite signal is then applied to the base or control element of transistor T2.

The operation of the FIG. 2 control circuit is similar to that of the FIG. 1 circuit outlined above. Generator G'' senses the rotation of the controlled shaft and produces a D.C. output signal (across resistor 75) in response thereto. This signal is the D.C. component of composite signal C and is indicated by the dashed lines in FIGS. 4b and 4c. The A.C. component of signal C, represented by the sine waves in FIGS. 4a, 4b and 4c, is generated by oscillator 77 and combined with this D.C. component through coupling capacitor 91. It will be understood that the output of oscillator 77 may be any periodic, time-varying wave, and not necessarily a sine wave as illustrated. For purposes of explanation, however, it will be represented by the sine waves illustrated in FIGS. 4a, 4b and 4c. The preselected speed of the controlled shaft is determined by the setting or adjustment of movable contact 39, which controls the bias of transistor T2. As explained above in connection with FIG. 1, transistor T2 conducts, and the field coil FC is energized by power transistor T4, only when the instantaneous value of composite signal C goes below reference level R. It will again be assumed for purposes of explanation that the particular preselected speed of shaft 13 and the load conditions are such that a 50% duty cycle of transistor T4 maintains the angular velocity of shaft 13 at this preselected value. Under these conditions, when the controlled shaft is rotating at the desired angular velocity, the D.C. component produced by G'' is exactly equal to reference level R, and output transistor T4 has a 50% duty cycle (see FIG. 4a), transferring sufficient power to field coil FC to maintain the speed of the controlled shaft at this desired value. If the speed of the controlled shaft is greater than desired, transistor T2 conducts for a period less than 50% of a cycle of the A.C. component of the composite wave (see FIG. 4b), and less average power is transferred to the field coil, causing the speed of the shaft to quickly slow down to the preselected value. And finally, if the controlled shaft is rotating slower than desired, the diminished value of the D.C. output of the generator G'' causes transistor T2 to conduct for a period greater than 50% of a cycle of the A.C. component of signal C (see FIG. 4c), thereby causing more average power to be supplied to the field coil. This increases the coupling between the driven member and the controlled shaft, and causes the shaft rapidly to speed up to the desired value.

The FIG. 2 embodiment possesses the substantial advantages of the FIG. 1 embodiment outlined above. Because the transistors, and especially output transistor T4, of amplifier 31 conduct only part of the time, the amount of thermal dissipation in these transistors per unit of power transferred to the field coil is appreciably reduced. Because the FIG. 2 embodiment eliminates entirely a filter (such as filter network 24 in FIG. 1), the response time of the control is greatly reduced. Again the system may be designed to function as a critically damped servo system, providing regulation of the controlled shaft to within 2% of the selected value. The speed range of the FIG. 2 system, because no rectifier or filter network is employed in generating the composite signal (i.e., because the output of generator G'' does not have to overcome or exceed the threshold of rectifying diodes for speed regulation to be effected), is even greater than that of the FIG. 1 system, on the order of 150 to 1.

While a three-stage amplifier is illustrated in FIGS. 1 and 2 having an input transistor (T2) and a power or output transistor (T4), it will be understood that this is essentially a matter of design and that in any particular embodiment the number of stages employed will depend upon the rating of the field coil, the amplitude of the generator output signal, etc. A single transistor amplifier, for example, might be appropriate in certain systems. If a multiple stage amplifier is employed, the term amplifier is intended to include the power amplifier stage or stages with the input transistor (T2) being included in an electrical circuit which repetitively pulses these output stages. If, on the other hand, a single transistor amplifier is employed, the term amplifier includes this transistor, and the electrical circuit which applies the composite signal and the reference potential to the base or control element of this single transistor to repetitively pulse it includes simply the various conductors and passive circuit elements, for example resistor 73 in FIG. 1.

Although the transistors illustrated herein are of the PNP type, it is to be understood that the NPN type may be employed interchangeably provided the polarities of the various signals are correspondingly reversed. And while oscillator 77 is illustrated in FIG. 2 as a relaxation type oscillator, other suitable types, for example, a phase shift oscillator, a Weinbridge oscillator, or any of the LC oscillators, i.e., Hartley, Colpitts, etc. may be employed. Also, while field coil FC is illustrated as being directly energized by the output of amplifier 31, this coil may be indirectly controlled, for example, through a magnetic amplifier or other similar control device.

In view of the above, it will be seen that the several objects of the invention are achieved and other advantageous results attained.

As various changes could be made in the above constructions without departing from the scope of the invention, it is intended that all matter contained in the above description and shown in the accompanying drawings be interpreted as illustrative and not in a limiting sense.

What is claimed is:

1. A control for electrical apparatus having a driving member, a rotating driven member and electrical coupling apparatus having a field coil for controlling the degree of coupling between said driving member and said driven member thereby to vary the angular velocity of said driven member, said control comprising:

a generator driven by said driven member for producing an A.C. signal having an amplitude which is a function of the angular velocity of said driven member;

means for rectifying and partially filtering said A.C. signal electrically interconnected with said generator to supply a composite electrical signal having an A.C. component and a D.C. component, the magnitude of said D.C. component being a function of the angular velocity of said driven member;

a D.C. potential source adapted to supply a D.C. voltage which has a magnitude which is a function of a preselected angular velocity of said driven member; and an amplifier connected to said means and said source and including a transistor having an output circuit connected for energizing said field coil, said amplifier being responsive to the difference between the magnitude of said composite signal and the magnitude of said D.C. voltage for repetitively switching said output circuit between a conducting state wherein said field coil is energized and a cutoff state wherein said field coil is deenergized, the relative ratio between conduction and cutoff periods of said output circuit being a function of the magnitude of said D.C. component whereby the average level of the electrical power supplied to said field coil is controlled thereby to vary the degree of coupling between the driving member and the driven member to maintain the angular velocity of said driven member substantially equal to said preselected angular velocity.

2. A control for electrical coupling apparatus as set forth in claim 1 wherein said amplifier includes a second transistor responsive to said composite signal and said D.C. voltage for causing said first-mentioned transistor to be cut off during periods when the magnitude of said composite signal exceeds the magnitude of said D.C. voltage by a predetermined amount.

3. A control for electrical coupling apparatus as set forth in claim 2 wherein said means supplying said composite signal and said D.C. potential source are interconnected in parallel, and wherein both said means supplying said composite signal and said D.C. potential source are connected to a control element of said second transistor.

4. A control for electrical coupling apparatus as set forth in claim 1 wherein said D.C. potential source adapted to supply a D.C. voltage which has a magnitude which is a function of a preselected angular velocity of said driven member includes a potentiometer having a fixed resistance and a movable contact, said fixed resistance being connected across the output of a D.C. power supply, said movable contact being adapted to be positioned in accordance with said preselected angular velocity of said driven member.

5. A control for electrical apparatus as set forth in claim 1 wherein said means for rectifying and partially filtering said A.C. signal includes a rectifier for rectifying said A.C. signal and an RC network for partially filtering the rectified output signal, said filter network being adapted to pass a portion of an A.C. ripple component present in said output signal, said portion constituting the A.C. component of said composite signal.

6. A control for electrical apparatus having a driving member, a rotating driven member and electrical coupling apparatus having a field coil for controlling the degree of coupling between said driving member and said driven member thereby to vary the angular velocity of the driven member, said control comprising:

a generator driven by said driven member for producing an A.C. signal having an amplitude proportional to the angular velocity of said driven member;

means for rectifying and partially filtering said A.C. signal electrically interconnected with said generator to supply a composite electrical signal having an A.C. component and a D.C. component, the magnitude of the D.C. component being proportional to the angular velocity of said driven member;

an amplifier having an output circuit connected for energizing said field coil, said amplifier including an input transistor having a control element, said transistor having an conducting state and a cutoff state, said amplifier energizing said field coil only during periods of conduction of said input transistor;

means for applying said composite signal to the control element of said transistor; and means for applying to the control element of said transistor a reference D.C. potential the magnitude of which is a function of a preselected angular velocity of said driven member thereby to cut off said transistor whenever the magnitude of said composite signal exceeds said reference potential by a preselected amount whereby said transistor is repetitively pulsed between its conducting and cutoff states and the relative ratio between its periods of conduction and cutoff controls the average level of the electrical power supplied to said field coil by said amplifier thereby to vary the degree of coupling between the driving member and the driven member to maintain the angular velocity of said driven member substantially equal to said preselcted angular velocity.

7. A control for electrical apparatus as set forth in claim 6 wherein said amplifier further includes a power transistor responsive to said input transistor for energizing said field coil, and wherein said power transistor conducts only during periods of conduction of said input transistor whereby the thermal dissipation in said power transistor per unit of power transferred to said field coil is reduced.

8. A control for electrical apparatus as set forth in claim 7, wherein said means for rectifying and partially filtering said A.C. signal includes a full-wave rectifier for rectifying said A.C. signal and an RC filter network for partially filtering the rectified output signal of said rectifier, said filter network being adapted to pass a portion of an A.C. ripple component present in said output signal, said portion constituting the A.C. component of said composite signal.

9. A control for electrical apparatus having a driving member, a rotating driven member, and electrical coupling apparatus having a field coil for controlling the degree of coupling between said driving member and said driven member thereby to vary the angular velocity of the driven member, said control comprising:

a generator driven by said driven member for producing an A.C. signal having an amplitude proportional to the angular velocity of said driven member;

means for rectifying and partially filtering said A.C. signal electrically interconnected with said generator to suppy a composite electrical signal having an A.C. component and a D.C. component, the magnitude of the D.C. component being proportional to the angular velocity of said driven member;

a power supply having first and second output terminals;

an amplifier for energizing said field coil, said amplifier including an input transistor and a power transistor, each of said transistors have base, emitter, and collector elements, the collector of said input transistor being connected to said first output terminal by a collector resistor, said field coil being connected between the collector of said power transistor and said first terminal, the emitters of said transistors being connected to said second terminal, the base of said power transistor being coupled to the collector of said input transistor whereby said power transistor amplifies the output of said input transistor;

means for applying said composite signal to the base of said input transistor;

and means for applying to the base of said input transistor a reference D.C. potential the magnitude of which is proportional to a preselected angular velocity of said driven member thereby to cut off said transistor whenever the magnitude of said composite signal exceeds said reference potential by a preselected amount, said means for applying a reference potential including a potentiometer having a fixed resistance connected between said first and second terminals, a movable contact adapted to be positioned in accordance with said preselected angular velocity, and a coupling resistor connecting said movable contact to the base of said input transistor whereby said input transistor is repetitively pulsed between its conducting and cutoff states and the relative ratio between its periods of conduction and cutoff controls the average level of the electrical power supplied to said field coil by said power transistor thereby to vary the degree of coupling between the driving member and the driven member to maintain the angular velocity of said driven member substantially equal to said preselected angular velocity.

References Cited by the Examiner

UNITED STATES PATENTS

| | | | |
|---|---|---|---|
| 2,752,589 | 6/56 | De Long | 328—135 X |
| 2,775,724 | 12/56 | Clark | 317—5 |
| 2,793,327 | 5/57 | Bartz | 317—5 |
| 2,956,177 | 10/60 | Day | 307—88.5 |
| 2,977,510 | 3/61 | Adamson et al. | 317—33 |
| 2,992,340 | 7/61 | Floyd | 307—88.5 |
| 3,036,241 | 5/62 | Zelina | 317—5 |
| 3,062,988 | 11/62 | Fitch et al. | 317—5 |
| 3,089,061 | 5/63 | Nieuweboer | 317—5 |
| 3,100,889 | 8/63 | Cannon | 307—88.5 |
| 3,106,674 | 10/63 | Hamilton | 317—33 |

SAMUEL BERNSTEIN, *Primary Examiner.*